United States Patent
Shiono

(10) Patent No.: US 7,925,934 B2
(45) Date of Patent: Apr. 12, 2011

(54) INFORMATION PROVIDING SYSTEM, INFORMATION PROVIDING DEVICE, APPROPRIATENESS JUDGMENT INFORMATION GENERATION METHOD AND APPROPRIATENESS JUDGMENT INFORMATION GENERATION PROCESS PROGRAM

(75) Inventor: Takao Shiono, Tokyo (JP)

(73) Assignee: Rakuten, Inc., Tokyo (JP)

( * ) Notice: Subject to any disclaimer, the term of this patent is extended or adjusted under 35 U.S.C. 154(b) by 415 days.

(21) Appl. No.: 12/068,906

(22) Filed: Feb. 13, 2008

(65) Prior Publication Data

US 2008/0320341 A1 Dec. 25, 2008

(30) Foreign Application Priority Data

Feb. 16, 2007 (JP) .................................. 2007-035715

(51) Int. Cl.
*G06F 11/00* (2006.01)
(52) U.S. Cl. .......................................................... 714/57
(58) Field of Classification Search .......................... None
See application file for complete search history.

(56) References Cited

U.S. PATENT DOCUMENTS

| | | | |
|---|---|---|---|
| 6,941,310 B2 | 9/2005 | Ahad et al. | |
| 7,461,297 B2 * | 12/2008 | McLellan et al. | 714/39 |
| 2005/0102354 A1 * | 5/2005 | Hollenbeck et al. | 709/203 |
| 2006/0136427 A1 * | 6/2006 | Cabrera et al. | 707/10 |
| 2006/0149970 A1 * | 7/2006 | Imazu | 713/183 |
| 2007/0150737 A1 * | 6/2007 | Parupudi et al. | 713/175 |
| 2007/0293275 A1 * | 12/2007 | Kalinichenko et al. | 455/567 |

FOREIGN PATENT DOCUMENTS

| | | |
|---|---|---|
| JP | 2002-342086 | 11/2002 |
| JP | 2005-122756 | 5/2005 |
| JP | 2005-533324 | 11/2005 |
| JP | 2007-035715 | 2/2007 |

OTHER PUBLICATIONS

Interface '95 9, "Internet Technology in the age of multimedia," Sep. 1995, published by CQ Press, pp. 151-165, Chapter 6 "Technique for the Construction of World Wide Web Server".

(Continued)

*Primary Examiner* — Christopher S McCarthy
(74) *Attorney, Agent, or Firm* — Young & Thompson

(57) ABSTRACT

An information providing device including:
a registration information memory means for memorizing registration information from a database management system;
a request information receiving means for receiving request information for screen information transmitted from
a terminal device upon an instruction from a user;
an expiration date lapse judgment means for judging whether or not an expiration date setup for the registration information elapses when request information is received;
a registration information acquisition / update means for acquiring the registration information when the expiration date elapses;
an acquisition error detection means;
a screen information generation means for generating the screen information when the registration information is acquired through the program interface;
a screen information transmission means; and
an appropriateness judgment information generation means for generating appropriateness judgment information used for judging whether or not the screen information is appropriately generated on the basis of detection result of the acquisition error.

5 Claims, 10 Drawing Sheets

OTHER PUBLICATIONS

Fukui, E., "Illustrated Basics and Leading Edge of J2EE Server", DB Magazine, Japan, Kabushikikaisha Shoueisha, Feb. 1, 2004, vol. 13, No. 12, p. 62-69.

Yukio Kawamata, "Internet Technology in the Age of Multimedia", Interface, Japan, CQ Publishing Company, Sep. 1, 1995, vol. 21, No. 9, pp. 151-166.

Emi Fukui, "Illustrated Basics and Leading Edge of J2EE Server", DB Magazine, Japan, Shoueisha Corporation, Feb. 1, 2004, vol. 13, No. 12, pp. 62-69.

JP Office Action of Mar. 17, 2009 issued in Japanese Patent Application No. 2007-035715 and its English translation.

* cited by examiner

FIG. 4

API OPERATION AGGREGATION INFORMATION

| ITEM NAME | DESCRIPTION |
|---|---|
| TOTAL ACCESS NUMBER | TOP PAGE REQUEST NUMBER |
| TOTAL API CALL NUMBER | NUMBER OF TIMES DATA ACQUISITION API IS CALLED |
| CACHE REQUEST NUMBER | NUMBER OF TIMES DATA ARE READ OUT FROM CACHE |
| ERROR NUMBER | NUMBER OF TIMES DATA WAS NOT RETURNED FROM DATA ACQUISITION API (API ERROR NUMBER + DATABASE ERROR NUMBER) |
| MAXIMUM RESPONSE TIME | MAXIMUM VALUE OF TIME FROM DATA ACQUISITION API BEING CALLED UNTIL RETURN OF REGISTRATION DATA |
| MINIMUM RESPONSE TIME | MINIMUM VALUE OF TIME FROM DATA ACQUISITION API BEING CALLED UNTIL RETURN OF REGISTRATION DATA |
| AVERAGE RESPONSE TIME | AVERAGE VALUE OF TIME FROM DATA ACQUISITION API BEING CALLED UNTIL RETURN OF REGISTRATION DATA |

FIG.10

| DATA | TOTAL ACCESS NUMBER | TOTAL API CALL NUMBER | CACHE REQUEST NUMBER | ERROR NUMBER | | RESPONSE TIME (MILLISECOND) | | |
|---|---|---|---|---|---|---|---|---|
| | | | | API | DATABASE | MAXIMUM | MINIMUM | AVERAGE |
| NEWS | 2000000 | 1500000 | 500000 | 500 | 1500 | 2496 | 22 | 120 |
| WEATHER FORECAST | 2000000 | 1000000 | 1000000 | 1000 | 2000 | 1000 | 3 | 20 |
| NEWS CLIPPING | 2000000 | 1300000 | 700000 | 100 | 800 | 700 | 10 | 130 |
| TV PROGRAM CLIPPING | 2000000 | 1200000 | 800000 | 2000 | 2000 | 1520 | 20 | 140 |
| BLOG | 2000000 | 1650000 | 450000 | 1500 | 3500 | 1600 | 30 | 110 |

INFORMATION PROVIDING SYSTEM, INFORMATION PROVIDING DEVICE, APPROPRIATENESS JUDGMENT INFORMATION GENERATION METHOD AND APPROPRIATENESS JUDGMENT INFORMATION GENERATION PROCESS PROGRAM

BACKGROUND OF THE INVENTION

1. Field of the Invention

The present invention relates to an information providing system, an information providing device, an appropriateness judgment information generation method and an appropriateness judgment information generation process program in the information providing device for generating screen information configuring a screen of information displayed to a user in response to a request from a terminal device through a network on the basis of information registered in a database and for providing the screen information to a terminal device.

2. Discussion of the Related Art

One type of an information providing system is typically that generates a web page in response to a request from a terminal device such as a personal computer, connected to the internet, on the basis of data registered in a database and providing the web page to a terminal device.

Such a system includes, for example, as shown in an invention described in Japanese Unexamined Patent Publication No. 2002-342086, a web server and a database server in which a database management system such as a relational database management system (RDBMS) is incorporated. In a case where the web server receives a request from a terminal device, the web server issues a structured query language (SQL) through an application program interface (API) such as an open database connectivity (ODBC) or a JDBC from the web server program to acquire data from the DBMS. Then, the web server generates a web page on the basis of the data thus acquired and transmits the web page to a terminal device. Amass of web pages provided from a web server in such a manner is called a web site.

Meanwhile, as a web site for entrance into the Internet, a search engine, a web directory, or a portal site providing various information like "Infoseek (Registered Trademark)" is known. The top page of such a portal site plays an important role as a window to various services such as internet shopping, auction, reservation of accommodation facilities, blog, news, and stock quotation. Therefore, part of information of each service is shown in the top page (e.g. recommendation of product, introduction of blog, headline of news, stock quotation of a company that the user has assigned in advance, or the like). Such information is registered in a database respectively and updated as needed. Therefore, every time the web server receives a request from a terminal device, data are acquired from the database to thereby generate its top page.

However, because a number of accesses to the top page of portal sites reaches a massive number such as several millions to several tens of millions, if web servers access databases for every request, load to the web servers and database servers becomes excessive to thereby delay response to a terminal device.

Therefore, "cache" is ordinarily used in such portal sites in order to prevent the delay.

Specifically, for example, data acquired from the database is stored in a cache (herein after, data stored in a cache is also referred to as "cache data"), and an expiration date of the data is set up (e.g. three minutes since the data is stored in a cache). Upon receipt of a request from a terminal device, the web server first judges whether or not an expiration date of a cache elapses. In a case where the expiration date does not elapse, the web server reads out cache data. Meanwhile, in a case where the expiration date elapses, the web server instructs to acquire data to an API. Then when the data are acquired through the API, the web server updates the cache data and sets up an expiration date again. Because there is ordinarily few information shown on the top page 3. of a portal site, it is possible to reduce a number of accesses to the database by generating a web page in use of data stored in the cache within the expiration date. Therefore, it is possible to rapidly respond to terminal devices without applying load to web servers and database servers.

However, in a case where process delay in the API, process delay in DBMS and the like occur, and therefore data are not be acquired to thereby cause detection of an error such as a timeout, an expiration date of a cache is extended, and a web page is generated using cache data stored in the cache at present. As such, the web server can surely send its top page to terminal devices without lack of information even if a trouble occurs to a certain part.

SUMMARY OF THE INVENTION

However, in a case where an error is detected, part of information based on old data, which are not updated, is displayed on a top page. Therefore, it cannot be said that the top page is appropriately (or normally) generated. Therefore, if such cases often occur, it is required to investigate a cause of the trouble and to reinforce the system.

However, since a top page of portal site plays an important role as an entrance into the internet as mentioned above, even when certain data cannot be appropriately acquired because of a trouble of disabling appropriate generation of the top page, it should not be allowed to send an abnormal response to a terminal device (e.g. transmitting a hypertext transfer protocol (HTTP) status code 404). Therefore, the web server should treat that the top page is appropriately generated and transmit a normal response to the terminal device (e.g. transmitting HTTP status code 200). Therefore, an administrator or the like of a portal site has no means to understand whether or not a truly appropriate top page is generated.

The present invention has been made in consideration of the above problems. It is therefore an object of an illustrative, non-limiting embodiment of the present invention to provide an information providing system, an information providing device, an appropriateness judgment information generation method, and an appropriateness judgment information generation process program enabling to understand whether or not screen information is appropriately generated in an information providing system which memorizes registration information registered in a database into a memory means, having a cache or otherwise set up in it, and generates and sends the screen information such as a web page to a terminal device while updating the registration information on the basis of an expiration date of the registration information thus stored in the storing means, in response to a request from a terminal device.

According to a first aspect of an illustrative, non-limiting embodiment of the present invention, there is provided an information providing device including:

a registration information memory means for memorizing registration information which is registered in a database and is acquired from a database management system through a program interface for outputting inquiry information indicative of an inquiry to the database management system for managing the database;

a request information receiving means for receiving request information indicating request for screen information configuring display screen of presentation information, presented to a user, the request information being transmitted from a terminal device through a network on the basis of an instruction from a user;

an expiration date lapse judgment means for judging whether or not an expiration date set up with respect to the registration information, stored in the registration information memory means, elapses in a case where the request information is received;

a registration information acquisition/update means for acquiring the registration information through the program interface and for updating the registration information stored in the registration information memory means to the registration information thus acquired, in a case where the expiration date elapses;

an acquisition error detection means for detecting an acquisition error of the registration information through the program interface;

a screen information generation means for generating the screen information using the registration information stored in the registration information memory means in any one of cases where the expiration date does not lapse or where the acquisition error is detected, and for generating the screen information using the registration information memorized in the registration information memory means if the registration information is acquired through the program interface;

a screen information transmission means for transmitting the screen information thus generated through the network to the terminal device which transmits the request information; and an appropriateness judgment information generation means for generating appropriateness judgment information used for judging whether or not the screen information is appropriately generated on the basis of detection result of the acquisition error.

According to this aspect, the information providing device judges whether or not expiration date of registration information stored in the registration information memory means elapses upon receipt of request information from a terminal device. At this time, in a case where the expiration date does not elapse, the information providing device generates screen information using registration information memorized in the registration information memory means. On the other hand, in a case where the expiration date elapses, the information providing device acquires registration information registered in the database through a program interface, updates the registration information stored in the registration information memory means to the registration information thus acquired and simultaneously generates screen information by use of the registration information thus acquired. However, in a case where registration information cannot be acquired through the program interface because an acquisition error is detected, the information providing device generates screen information using registration information memorized in the registration information memory means. Then, the information providing device transmits the screen information thus generated to a terminal device and generates appropriateness judgment information to be used for judgment of whether or not screen information is appropriately generated on the basis of detection result of acquisition error.

Therefore, even in a case where registration information with its expiration date, memorized in the registration information memory means, elapsed is used to generate screen information because registration information could not be acquired through the program interface, and the screen information is transmitted to a terminal device thereby pretending the screen of the terminal device as if appropriate information is displayed, it is possible to understand whether or not the screen information is truly properly generated.

According to a second aspect of an illustrative, non-limiting embodiment of the present invention, there is provided the information providing device according to the first aspect, wherein the appropriateness judgment information generation means generates the appropriateness judgment information including acquisition error number information indicative of a detected number of the acquisition errors.

According to this aspect, the acquisition error number of registration information can be acquired as information used for judging whether or not screen information is appropriately generated.

According to a third aspect of an illustrative, non-limiting embodiment of the present invention, there is provided the information providing device according to the second aspect, wherein the acquisition error detection means detects an error in the database management system and an error in the program interface excluding an error in the database management system, respectively as the acquisition error, and the appropriateness judgment information generation means generates the appropriateness judgment information including first error number information indicating an error number in the database system and second error number information indicating an error number in the program interface.

According to this aspect, the error number in the database management system and the error number in the program interface can be acquired as the acquisition error number. Therefore, it is possible to judge whether reinforcement of a system is directed to a system having the database and the database management system incorporated in it or to a system having the program interface incorporated in it.

According to a fourth aspect of an illustrative, non-limiting embodiment of the present invention, there is provided an appropriateness judgment information generation method in an information providing device including a registration information memory means for storing registration information which is registered in a database and is acquired from a database management system through a program interface for outputting inquiry information indicating an inquiry to the database management system for managing the database including:

a request information receiving step of receiving request information indicating screen information request configuring display screen of presentation information suggested to a user, the request information being transmitted from a terminal device through a network on the basis of an instruction from a user;

an expiration date lapse judgment step of judging whether or not an expiration date set up for the registration information, memorized in the registration information memory means elapses in a case where the request information is received;

a registration information acquisition/update step of acquiring the registration information through the program interface and of updating the registration information memorized in the registration information memory means to the registration information thus acquired in a case where the expiration date elapses;

an acquisition error detection step of detecting an acquisition error of the registration information through the program interface;

a screen information generation step of generating the screen information using the registration information memorized in the registration information memory means in any one of cases where the expiration date does not elapse or where the acquisition error is detected and for generating the screen information using the registration information thus acquired in the case where the registration information is acquired through the program interface;

a screen information transmission step of transmitting the screen information thus generated through the network to the terminal device transmitting the request information; and an appropriateness judgment information generation step of generating appropriateness judgment information used for judging whether or not the screen information is appropriately generated on the basis of the error detection result.

According to a fifth aspect of an illustrative, non-limiting embodiment of the present invention, there is provided an appropriateness judgment information generation process program which causes a computer included in an information providing device having a registration information memory means for memorizing registration information, which is registered in a database and is acquired from a database management system through a program interface for outputting inquiry information indicating an inquiry to the database management system for managing the database, to function as:

a request information receiving means for receiving request information indicative of screen information configuring display screen of presentation information presented to a user, the request information being transmitted from a terminal device through a network on the basis of an instruction from a user;

an expiration date lapse judgment means for judging whether or not an expiration date set up for the registration information memorized in the registration information memory means elapses in a case where the request information is received;

a registration information acquisition/update means for acquiring the registration information through the program interface in a case where the expiration date elapses and for updating the registration information memorized in the registration information memory means to the registration information thus acquired;

an acquisition error detection means for detecting an acquisition error of the registration information through the program interface;

a screen information generation means for generating the screen information using the registration information memorized in the registration information memory means in any one of cases where the expiration date does not elapse or where the acquisition error is detected and for generating the screen information using the registration information thus acquired in a case where the registration information is acquired through the program interface;

a screen information transmission means for transmitting the screen information thus generated through the network to the terminal device which transmitted the request information; and an appropriateness judgment information generation means for generating appropriateness judgment information used for judging whether or not the screen information is appropriately generated on the basis of the acquisition error detection result.

According to the present invention, even in a case where screen information is generated by use of registration information with elapsed expiration date which is memorized in the registration information memory means because registration information could not be acquired through the program interface and the screen information is transmitted to a terminal device to show as if appropriate information is displayed on a display of the terminal device, it is possible to understand whether or not the screen information is truly and appropriately generated.

BRIEF DESCRIPTION OF THE DRAWINGS

In the accompanying drawings:

FIG. 4 is a view showing an example of API operation aggregation information collected by the web server 1 according to the present embodiment;

FIG. 10 is a view showing an example of aggregation result of the API operation aggregation information in the process shown in FIGS. 7 and 8.

DESCRIPTION OF THE PREFERRED EMBODIMENTS

Figure 1:
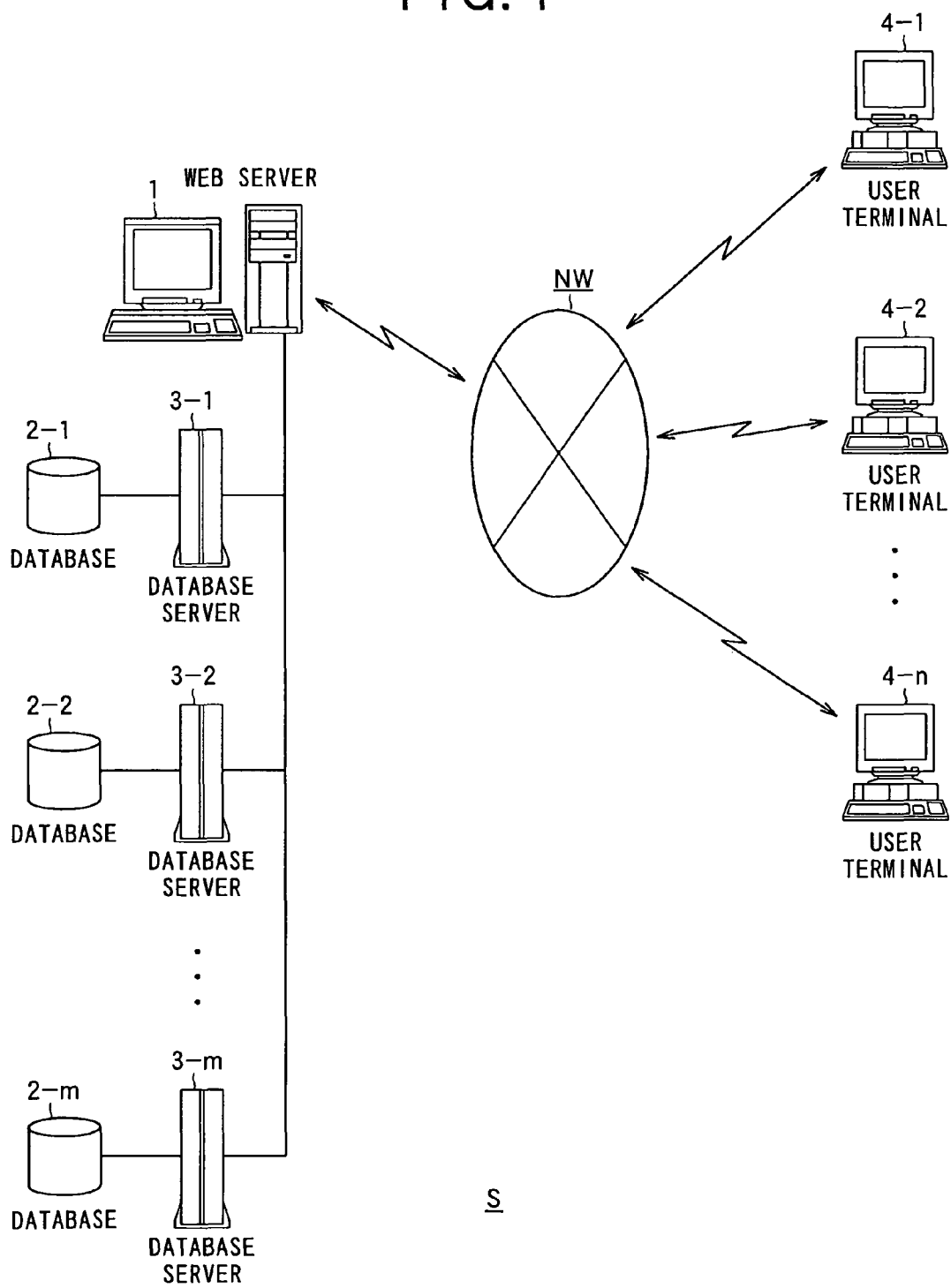
FIG. 1 is a view showing an example of schematic configuration of a portal site system S according to the present embodiment.

Hereinafter, a best embodiment of the present invention will be described in detail with reference to figures. Here, an embodiment explained below is an embodiment in a case where the present invention is applied to a portal site system.

Meanwhile, each designation of numerical reference in the drawings is typically as follows:

1: Web server;
2-$j$: Database;
3-$j$: Database server;
4-$k$: User terminal;
11: Operation unit;
12: Display unit;
13, 31: Communication unit;
14: Drive unit;
15, 32: Memory unit;
16, 33: Input/output interface;
17, 34: CPU;
18, 35: ROM;
19, 36: RAM;
20, 37: System controller;
21, 38: System bus;
NW: Network; and
S: Portal site system

[1. Brief Overview of Configuration and Function of Portal Site System]

First, configuration and function of a portal site system S according to the present embodiment will be described with reference to FIGS. 1 to 4.

FIG. 1 is a view showing an example of schematic configuration of the portal site system S according to the present embodiment.

As shown in FIG. 1, the portal site system S includes a web server 1 as an example of an information providing device, a plurality of database servers 3-$j$ ($j$=1, 2, . . . m) each having a database 2-$j$, and a user terminal 4-$k$ ($k$=1, 2, . . . n) as an example of a terminal device.

The web server 1 and the user terminal 4-$k$ can mutually send and received at a using, for example, transmission control protocol/internet protocol (TCP/IP) or the like as communication protocol through a network NW. Here, the network NW includes, for example, the Internet, a dedicated communication line (e.g. a community antenna television (CATV) line), a mobile communication network (including a base station and the like), a gateway and the like. Moreover, the web server 1 and each of the database servers 3-$j$ can mutually send and receive data through, for example, a local area network (LAN).

In such a portal site system S, the web server 1 is a server device provided for opening a portal site by a service provider, providing various services through the network NW.

The portal site provides various services such as search of a web page, internet shopping, auction, reservation of accommodation facilities, news, weather forecast, TV program list, web mail, stock quotation, social networking service (SNS), web directory, and blog, to a user in a user terminal 4-$k$. Specifically, in response to a request from a user terminal 4-$k$ through the network NW, the web server 1 sends a web page (herein after, also referred to as a "page") to the user terminal 4-$k$ to thereby provide various services through information displayed in the web page. Here, depending on the service (e.g. internet shopping, auction, reservation of accommodation, SNS, blog, or the like), the service may be provided when the user terminal 4-$k$ accesses to a web server other than the web server 1. In FIG. 1, such the server devices are not shown.

The web server 1 generates a top page 200 (vide FIG. 2), which is to be described later, as an example of screen information in order to provide the above-mentioned various services, and then the page is provided (sent) to the user terminal 4-$k$.

Next, the database server 3-$j$ is a server device for managing each of databases 2-$j$. Specifically, the database server 3-$j$ carries out processes such as new registration, update, and acquisition of data (an example of registration information) to the database 2-$j$ in response to a request from the web server 1, the server device or the like (not shown).

Data for providing predetermined various services are registered in each of the databases 2-1 to 2-$m$. For example, data regarding a web page for searching for a web page or the like is registered in a web search database, data regarding auctioned goods or auctioning condition is registered in an auction database, and data regarding news are registered in a news information database. Here, in a portal site, a user must proceeds to register a membership in the portal site system S so as to be assigned to use certain service (e.g. internet shopping, auction, reservation of accommodation, SNS, and the like). Information regarding a member thus registered (herein after referred to as "member information") is also registered in the database 2-$j$.

Next, the user terminal 4-$k$ accesses to the web server 1, acquires a web page, and displays it on a screen. A personal computer, a personal digital assistant (PDA), a set top box (STB), a cellular phone, and otherwise, in which a web browser application, an electronic mail application or the like is respectively installed, are applicable as a terminal device used by a user for the purpose of viewing various information or using various services through the web page FIG. 2 is a view showing a display example of the top page 200 of a portal site provided by the web server 1 according to the present embodiment.

Figure 2:
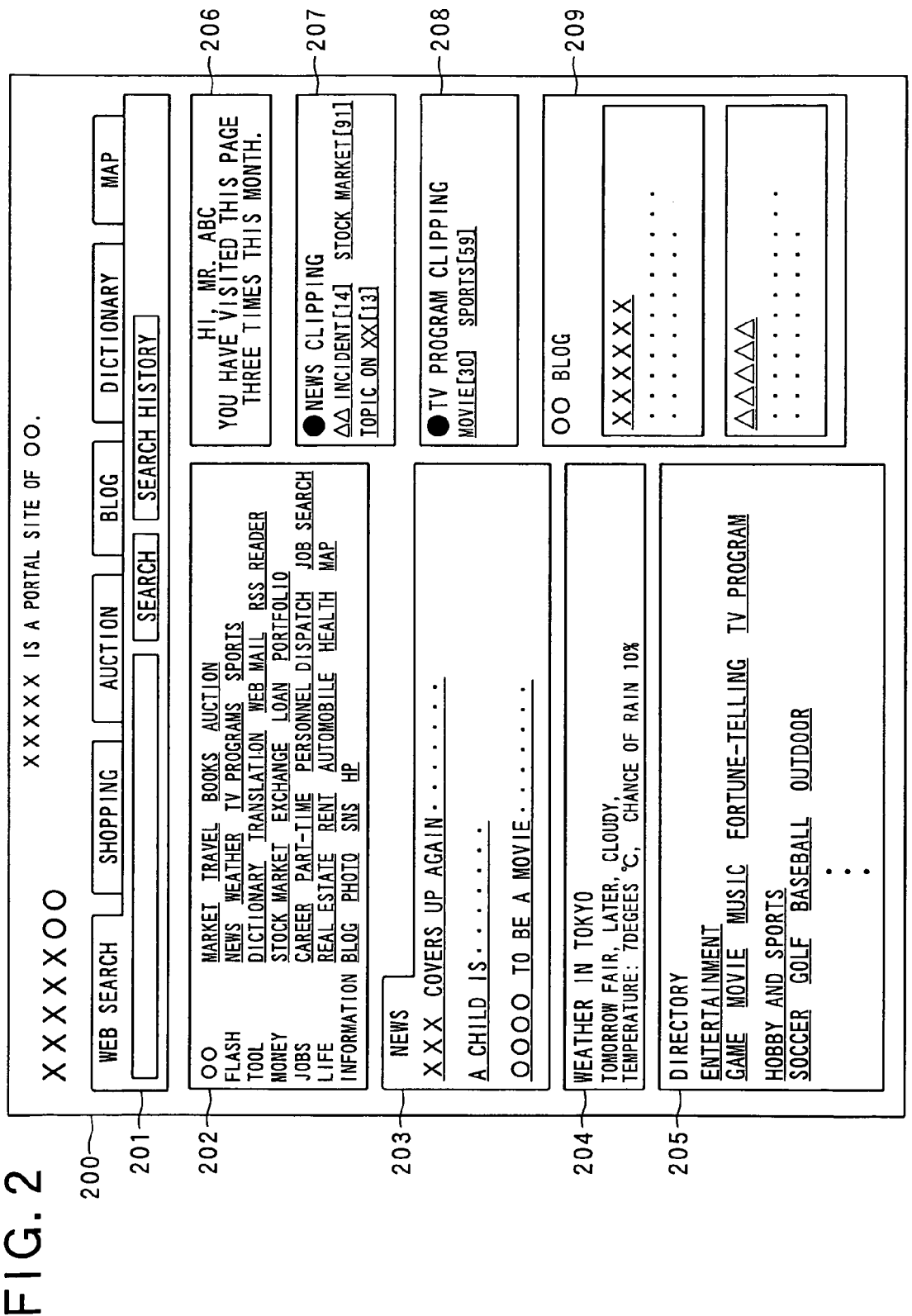
FIG. 2 is a view showing a display example of a top page 200 of a portal site provided by a web server 1 according to the present embodiment.

As shown in FIG. 2, there are provided a web search area 201, a links display area 202, a news headline area 203, a weather forecast display area 204, a web directory display area 205, a visitor count display area 206, a news clipping display area 207, a TV program clipping display area 208, and a blog introduction area 209 in the top page 200.

In the web search area 201, a form or a button for inputting a keyword to carry out search of a web page or the like is provided. Moreover, in the links display area 202, links to pages for various services are provided. Further, in the news headline area 203, headlines of a part of latest news are displayed. At the same time, a link to a page displaying the headlined news is provided. Further, in the weather forecast display area 204, weather forecast for the next day of an area where a user lives in (the area being acquired from the address registered as member information or the like) is displayed. Further, in the web directory display area 205, links to pages of each category, which classifies web sites, to search for the web site registered in a web directory are provided.

Further, in the visitor count display area 206, a nickname of a user which is registered as member information and a number of accesses to a top page by the user in the current month are displayed. Further, in the news clipping display area 207, a predetermined keyword and a number of news related to the keyword are displayed, and simultaneously a link to a page displaying a list of the related news is provided. Further, in the TV program clipping display area 208, a predetermined keyword and a number of TV programs related to the keyword are displayed, and simultaneously a link to a page displaying a list of the related programs is provided. Further, in the blog introduction area 209, introduction of a latest blog and a blog which is attracting attention is displayed, and simultaneously a link to a page of the blog is provided.

Information displayed in each area is, for example, information respectively acquired from the database 2-$j$ with respect to each area. For example, a headline displayed in the news headline area 203 or data regarding a number of news displayed on the news clipping display area 207 are acquired from a news information database. Moreover, data regarding weather forecast displayed in the weather forecast display area 204 are acquired from a weather forecast information database. Further, a nickname and a visitor count displayed in the visitor count display area 206 are acquired from a member information database. Further, data regarding a number of TV programs displayed in the TV program clipping area 208 are registered in a TV program list information database. Further, data regarding introduction of a blog displayed in the blog introduction area 209 are registered in a blog information database.

Here, the web server 1 acquires each data registered in the database 2-$j$ from the database server 3-$j$ to thereby generate the top page 200 in response to a request from the user terminal 4-$k$. For the purpose of reducing load of each server, a cache is provided in correspondence with each database in the web server 1. The web server 1 memorizes data acquired from the database server 3-j in the cache and generates the top page 200 using the data thus memorized.

However, regarding data having different content for each user such as a nickname or a visitor count, a cache must be prepared for all the users. Since this is inefficient from a viewpoint of storage capacity and the like, a cache is not prepared for such data. Therefore, the web server 1 acquires such data from the database server 3-j every time a request from the user terminal 4-k is received.

Figure 3:
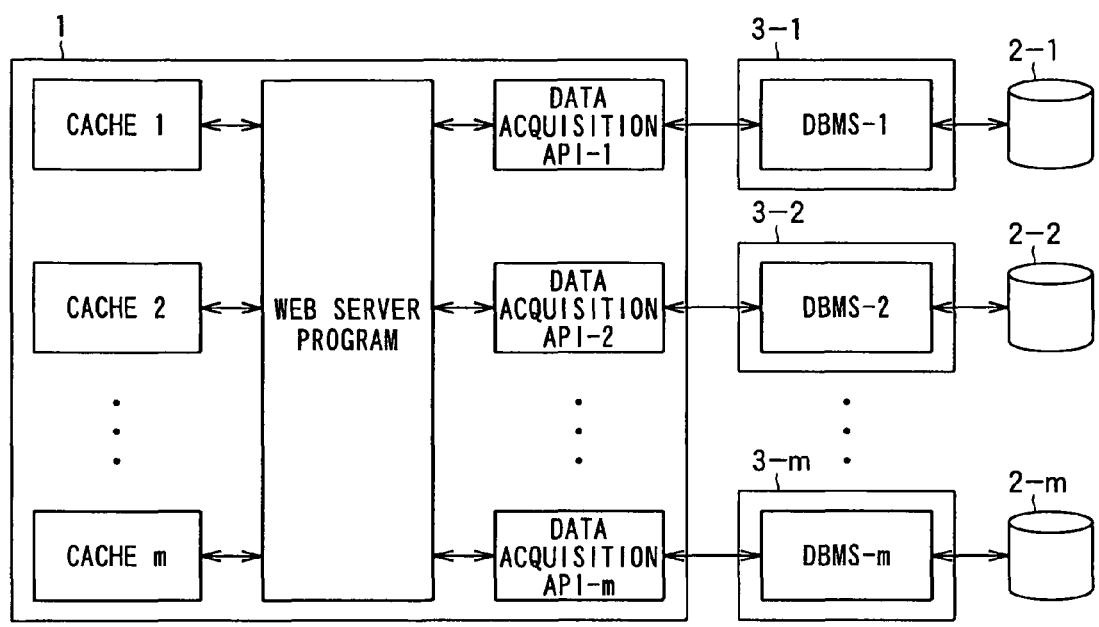
FIG. 3 is a block diagram showing a schematic example of functional configuration of the portal site system S according to the present embodiment.

FIG. 3 is a block diagram showing a schematic example of functional configuration of the portal site system S according to the present embodiment.

As shown in FIG. 3, DBMS-1 to m as an example of a database management system being a software for managing each of databases 2-l to 2-m are incorporated in the database servers 3-l to 3-m.

Meanwhile, in the web server 1, a web server program as an example of an appropriateness judgment information generation process program is incorporated. The web server program is a program for receiving a request from a user terminal 4-k, generating a web page in response to the request, and transmitting the page to the user terminal 4-k. For example, a hyper text transfer protocol daemon (HTTPd) or the like can be applied to the program. Moreover, caches 1 to m are provided and data acquisition API 1 to m as an example of a program interface are incorporated in the web server 1, in correspondence with each of databases 2-1 to 2-m.

Here, although not shown, since a cache is not provided for data having different content for each user as mentioned above, only data acquisition API is incorporated in these data.

A data acquisition API-j is a middleware for outputting a SQL command as an example of inquiry information on the basis of an instruction from the web server program, for transmitting the command to a corresponding DBMS-j (database server 3-j), for acquiring the data transmitted from the DBMS-j in response to the output of the SQL command, and for conveying the data to the web server program. Moreover, the data acquisition API-j is an interface between the middleware and a web server program, and for example ODBC or JDBC can be applied as the data acquisition API-j.

The web server program generates the top page 200 using cache data (an example of registration information memorized in a registration information memory means) memorized in the cache j as mentioned above. However, in a case where there is cache data with its expiration date elapsed, the web server program is programmed to instruct acquisition of data to the data acquisition API-j corresponding to the cache data, generates the top page 200 using data acquired from the database 2-j by the data acquisition API-j, and updates the cache data to the data thus acquired.

Here, the web server program is programmed to generate the top page 200 using cache data memorized in the cache j and to extend an expiration date of the cache data in a case where an error occurs in the data acquisition API-j or the DBMS-j, and where data cannot be acquired through the data acquisition API-j. Because the top page 200 generated at this time is generated on the basis of old data in part, it is difficult to say that the page is appropriately generated. Therefore, in the present embodiment, API operation aggregation information is collected as information to be used as information for judgment to judge whether or not the top page 200 is appropriately generated and to reinforce the system.

FIG. 4 is a view showing an example of API operation aggregation information collected by the web server 1 according to the present embodiment.

As shown in FIG. 4, a total access number, a total API call number, a cache request number, an error number (an example of acquired error number information), a maximum response time, a minimum response time, and an average response time are collected as the API operation aggregation information for each data acquisition API-j.

The total access number is a number of page being viewed, that is, a number of requests from the user terminal 4-k to the top page 200. Moreover, the total API call number is a number of the data acquisition API-j being called from the web server program, i.e. a number of instructions to the data acquisition API-j for acquisition of data registered in the database 2-j. Further, the cache request number is the number of cache data memorized in the cache j, being read out from the web server program. The cache request number includes a number of cache data being read out when the expiration date of the cache j does not elapse and a number of cache data being read out when the expiration date of the cache j elapses because the data registered in the database 2-j cannot be acquired through the data acquisition API-j.

The error number is the number of times data cannot be conveyed from the data acquisition API-j in response to the call from the data acquisition API-j, i.e. a number of times the data registered in the database 2-j cannot be acquired. The error number is a sum of a database error number and an API error number. The API error number is a number of times of time out errors in a case where no response is received from the data acquisition API-j with respect to a data acquisition instruction from the web server program to the data acquisition API-J within a predetermined period of time. Moreover, the database error number is the number of times of time out errors in a case where no response is received from the data acquisition DBMS-j with respect to an inquiry from the data acquisition API-j to the DBMS-j (output of a SQL command) within a predetermined period of time.

The response time is a time from instruction by the web server program to the data acquisition API-j for acquisition of data until the data acquisition API-j conveys the data to the web server program. A maximum response time, a minimum response time, and an average response time respectively designate a maximum value, a minimum value, and an average value of the response times, collected up until then. In the present embodiment, although a response time in a case where an API error and database error are detected (in this case, a time from instruction by the web server program to the data acquisition API-j for acquisition of data until detection of the error) is not acquired, the response time in such the case may be acquired and reflected to each of the maximum, minimum, and average response times.

[2. Configuration and Function of Web Server]

Next, configuration and function of the web server 1 will be explained in reference of FIG. 5.

Figure 5:
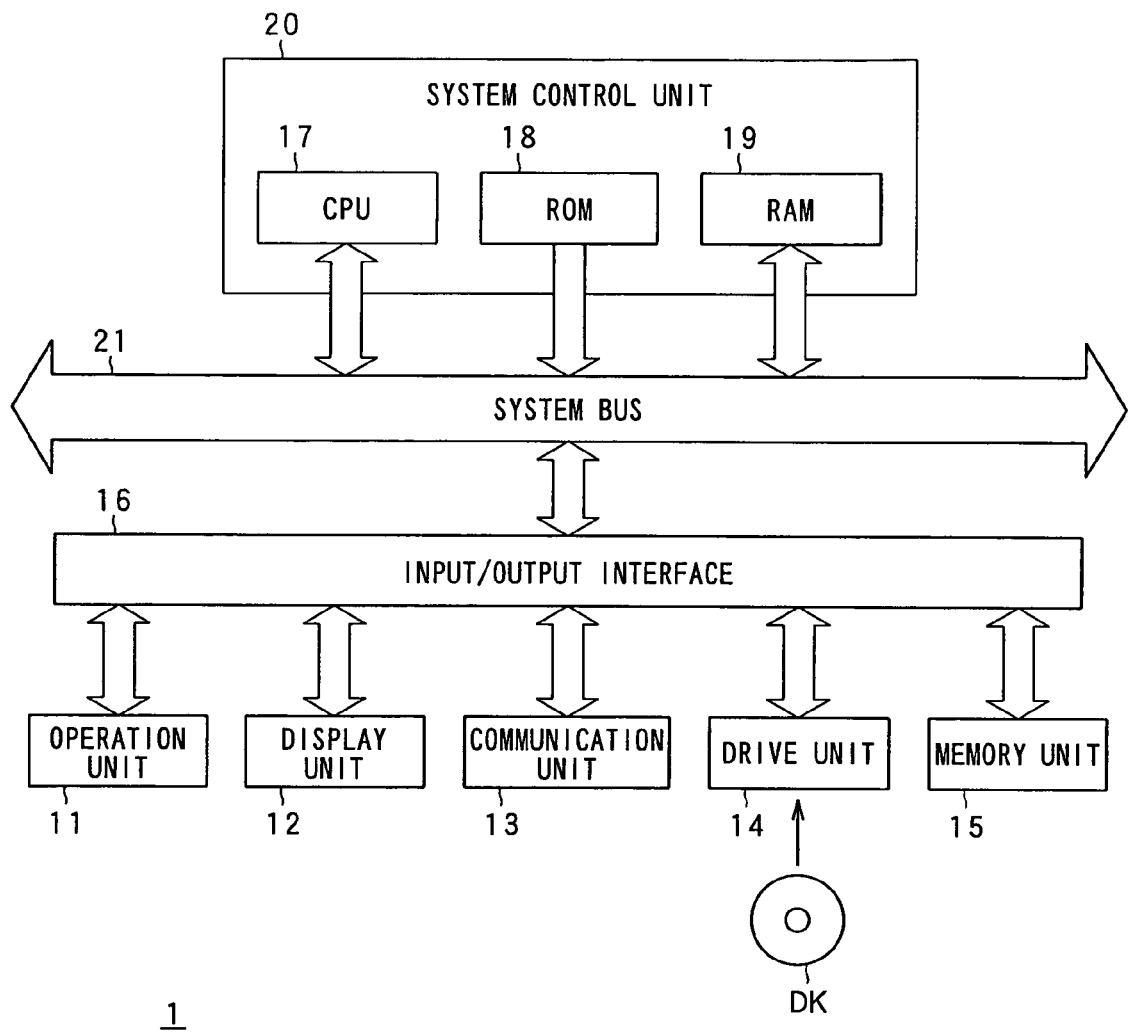
FIG. 5 is a block diagram showing an example of schematic configuration of the web server 1 according to the present embodiment.

FIG. 5 is a block diagram showing an example of schematic configuration of the web server 1 according to the present embodiment.

As shown in FIG. 5, the web server 1 includes: a operation unit 11, a display unit 12 (e.g. a cathode ray tube (CRT) display, a liquid crystal display, or the like), a communication unit 13, a drive unit 14, a memory unit 15, an input/output interface unit 16, and a system control unit 20. The system control unit 20 and the input/output interface unit 16 are connected through a system bus 21.

The operation unit 11 is for example a keyboard, a mouse, or the like, and receives an operation instruction from an operator or the like and outputs the instruction to the system control unit 20 as an instruction signal. The display unit 12 is for example a cathode ray tube (CRT) display, a liquid crystal display, or the like, and displays information such as characters or images. The communication unit 13 is connected to a network NW or the like and controls communication condition with the database server 3-*j*, the user terminal 4-*k*, or the like. The drive unit 14 reads out data or the like from, for example, a disc DK which is for example a flexible disc, a compact disc (CD), a digital versatile disc (DVD) or the like. Meanwhile, the drive unit 14 records data or the like to the disc DK. The memory unit 15 is a hard disc drive or the like, which saves various kinds of programs and data. The input/output interface unit 16 carries out interface process between the operation unit 11 to the memory unit 15 and the system control unit 20. The system control unit 20 includes a central processing unit (CPU) 17, a read only memory (ROM) 18, a random access memory (RAM) 19, and the like.

The memory unit 15 memorizes API operation aggregation information corresponding to each of data acquisition API-1 to m by each period of, for example, one hour, one day, one week, or one month.

Further, caches 1 to m are provided (an area for memorizing each cache data is secured) on the memory area of the memory unit 15. Further, expiration date of a cache j (expiration date of data memorized in the cache j) is memorized in the memory unit 15 corresponding to each of caches 1 to m. The expiration date indicates a period (date or time) during which the top page 200 can be generated by use of cache data memorized in the cache j. Depending on the nature of data (whether it is preferable for the data to set time interval for reflecting update in the database server 3-*j* to the cache j short or whether the time interval may be set to be long, or the like), a period from storage of data into the cache j as cache data until the cache data becomes void is previously determined (that is, a period until expiration can be changed with respect to each cache j) and on the basis of the period, expiration date is set.

Further, a predetermined operating system, the above-mentioned web server program, the data acquisition API-j, and the like are memorized in the memory unit 15. Here, the memory unit 15 is an example of a registration information memory means in the present embodiment.

The various kinds of programs may be acquired through the network NW from, for example, another server device or the like or may be recorded in the disc DK such as a CD-ROM and read out through the drive unit 14.

The system control unit 20 configures an example of a request information receiving means, a period expiration judgment means, a registration information acquisition/update means, an acquisition error detection means, a screen information generation means, a screen information transmission means, and an appropriateness judgment information generation means.

Then, when the CPU 17 reads out various kinds of programs memorized in the ROM 18 or the memory unit 15, the system control unit 20 controls each part of the web server 1 and simultaneously functions as each of the above-mentioned means.

Explaining function as these means, the system control unit 20 as the request information receiving means and the period expiration judgment means judges whether or not expiration date set for the cache j has elapsed upon receiving top page request (an example of request information) transmitted from the user terminal 4-*k*.

The system control unit 20 as the registration information acquisition/update means instructs acquisition of data to the data acquisition API-j corresponding to the cache j to activate the data acquisition API-j when it is judged that the expiration date of the cache j has elapsed. The data registered in a corresponding database 2-*j* is acquired from the database management system 3-*j* through the data acquisition API-j and the system control unit 20 updates the corresponding cache j to the data thus acquired.

The system control unit 20 as the acquisition error detection means detects a data acquisition error through the data acquisition API-j. Specifically, the system control unit 20 sets up a timer when the data acquisition API-j is activated. In a case where there is no response from the data acquisition API-j after a predetermined period of time (e.g. 3 seconds) from the activation of the data acquisition API-j, the system control unit 20 detects it as an API error. Moreover, the system control unit 20 acquires a database error as a response from the data acquisition API-j in a case where there is no response from the DBMS-j after a predetermined period of time (e.g. 2 seconds) after output of an SQL command from the data acquisition API-j. In such cases, time periods of enabling to detect an API error and a database error can be individually set for each of data acquisition API-l to m.

The system control unit 20 as the screen information generation means generates the top page 200 using cache data memorized in caches 1 to m. At this time, in a case where an expiration date of any one of the caches 1 to m passes and data are acquired through the data acquisition API-j, the system control unit 20 uses the acquired data for generation of the top page 200. That is, in a case where the expiration date of the cache j does not elapse, cache data memorized in the cache j are used for generation of the top page 200. In a case where expiration date passes and data are acquired through the data acquisition API-j, the latest data thus acquired are used for generation of the top page 200. In a case where expiration date passes and data acquisition error through the data acquisition API-j are detected, old cache data are used for generation of the top page 200.

The system control unit 20 as the screen information transmission means transmits the top page 200 thus generated to the user terminal 4-*k* which transmits the top page request.

The system control unit 20 as the appropriateness judgment information generation means generates an error number on the basis of a detection result of data acquisition error through the data acquisition API-j and memorizes the error number in the memory unit 15. Specifically, the system control unit 20 updates the API error number in the memory unit 15 by adding 1 to the API error number, memorized in the memory unit 15, every time an API error is detected. The value thus updated is memorized into the memory unit 15 as new API error number. Further, the system control unit 20 updates the database error number in the memory unit 15 by adding 1 to the database error number, memorized in the memory unit 15, every time a database error is detected. The value thus updated is memorized into the memory unit 15 as new database error number.

Judgment of expiration date, data acquisition through the data acquisition API-j, error detection, and update of error number are carried out with respect to each cache j.

[3. Configuration and Function of Database Server]

Next, configuration and function of the database server 3-*j* will be described in reference of FIG. 6.

Figure 6:
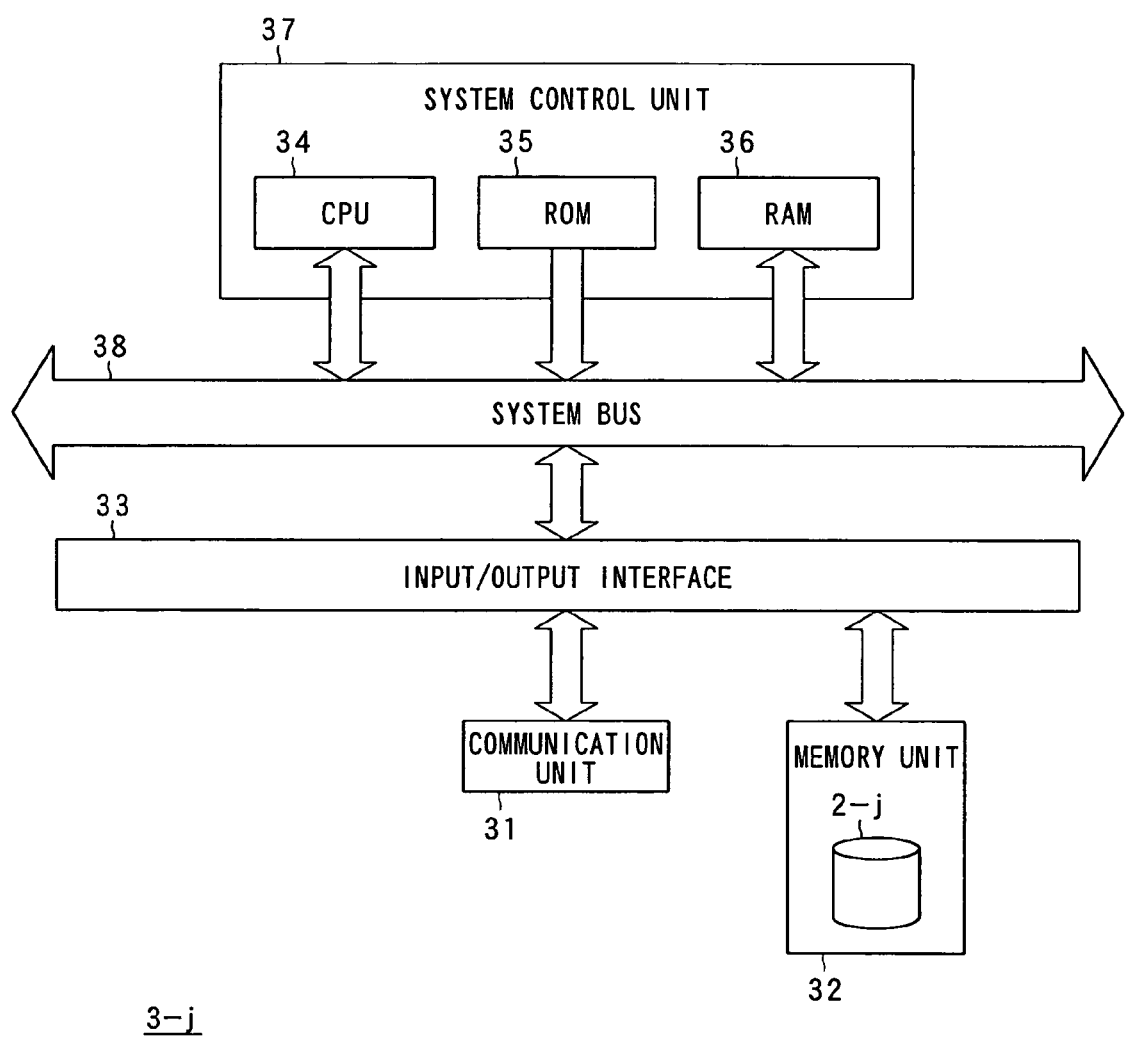
FIG. 6 is a block diagram showing an example of schematic configuration of a database server 3-$j$ according to the present embodiment.

FIG. 6 is a block diagram showing an example of schematic configuration of a database server 3-*j* according to the present embodiment.

As shown in FIG. 6, the database server 3-*j* includes a communication unit 31, a memory unit 32, an input/output interface unit 33, and a system control unit 37. The system control unit 20 and the input/output interface unit 33 are connected through a system bus 38.

The communication unit 31 is connected to a LAN and controls communication status with the web server 1. Moreover, the memory unit 32 is, for example, a hard disc drive or the like and memorizes various programs, data, and the like. The input/output interface unit 33 carries out interface process between the communication unit 31 and the memory unit 32 and the system control unit 37. The system control unit 37 includes a CPU 34, a ROM 35, a RAM 36, and the like.

In the memory unit 32, a database 2-$j$ is constructed. Moreover, a predetermined operating system, DBMS-j, and the like are memorized in the memory unit 32.

The system control unit 37 controls each part of the database server 3-$j$ when the CPU 34 reads out various programs memorized in the ROM 35 or the memory unit 32.

[4. Operation of Portal Site System]

Next, operation of the portal site system S will be explained using FIGS. 7 to 10.

Figure 7:
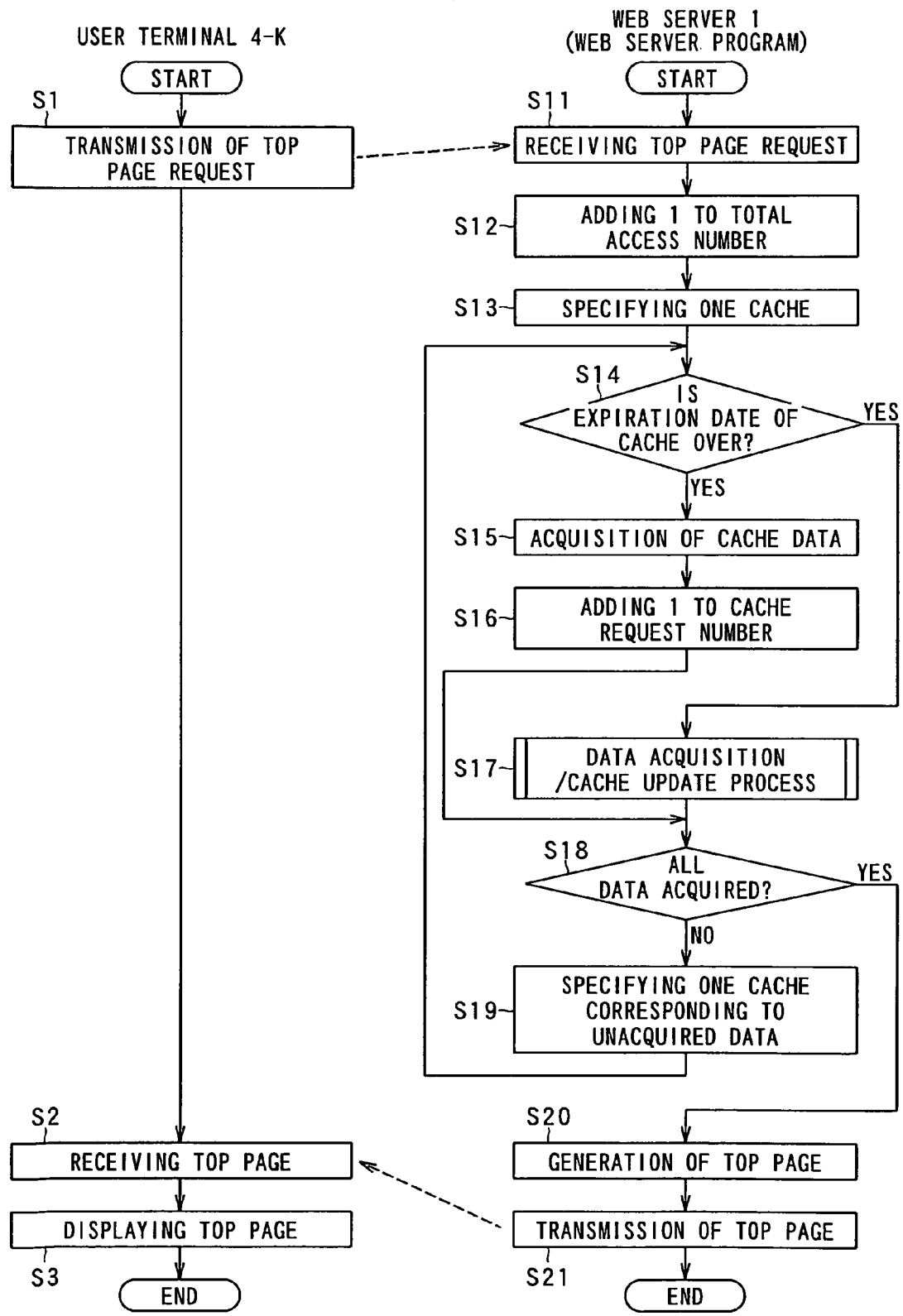
FIG. 7 is a flowchart showing an example of process from transmission of top page request from a user terminal 4-$k$ to display of the top page on the user terminal 4-$k$ in the portal site system S according to the present embodiment.

FIG. 7 is a flowchart showing an example of process of a flow from transmission of top page request from the user terminal 4-$k$ until the top page being displayed by the user terminal 4-$k$. Here, in FIG. 7, processes shown in Steps S11 to S21 are carried out by executing the web server program.

First, a user operates the user terminal 4-$k$, for example, a mouse, a keyboard, or the like to designate a uniform resource locator (URL) of the top page 200 to thereby instruct a top page request. Then, as shown in FIG. 7, the user terminal 4-$k$ transmits the top page request to the web server 1 (Step S1).

The system control unit 20 of the web server 1 receives the top page request (Step S11), adds 1 to the total access number memorized in the memory unit 15, and updates the total access number (Step S12).

Next, the system control unit 20 specifies one cache j from caches 1 to m (Step S13).

Next, the system control unit 20 judges whether or not expiration date set for the cache j thus specified elapses (Step S14). In a case where the expiration date does not elapse (Step S14: NO), the system control unit 20 acquires cache data as data for generation of the top page 200 from the cache j (Step S15), adds 1 to the cache request number memorized in the memory unit 15 corresponding to the cache j and updates the cache request number (Step S16). Then, the process goes to Step S18.

On the other hand, in a case where the expiration date elapses (Step S14: YES), the system control unit 20 executes a data acquisition/cache update process (Step S17). Then, the process goes to Step S18. Contents of the data acquisition/cache update process will be described later.

In Step S18, the system control unit 20 judges whether or not all the data for generation of the top page 200 are acquired (Step S18). In a case where there are unacquired data (Step S18: NO), the system control unit 20 specifies one cache j which corresponds to the unacquired data (Step S19). Then, the process goes to Step S14. That is, the system control unit 20 repeats the processes of Steps S14 to S19 until all the data are acquired.

Then, in a case where the system control unit 20 acquires all the data (Step S18: YES), the system control unit 20 generates the top page 200 using the data thus acquired (Step S20), transmits the top page 200 thus generated to the user terminal 4-$k$ (Step S21), and finishes the process.

The user terminal 4-$k$ receives the top page 200 (Step S2) and displays the page as shown in FIG. 2 (Step S3).

Next, the above-mentioned data acquisition/cache update process (Step S17 shown in FIG. 7) will be explained.

Figure 8:
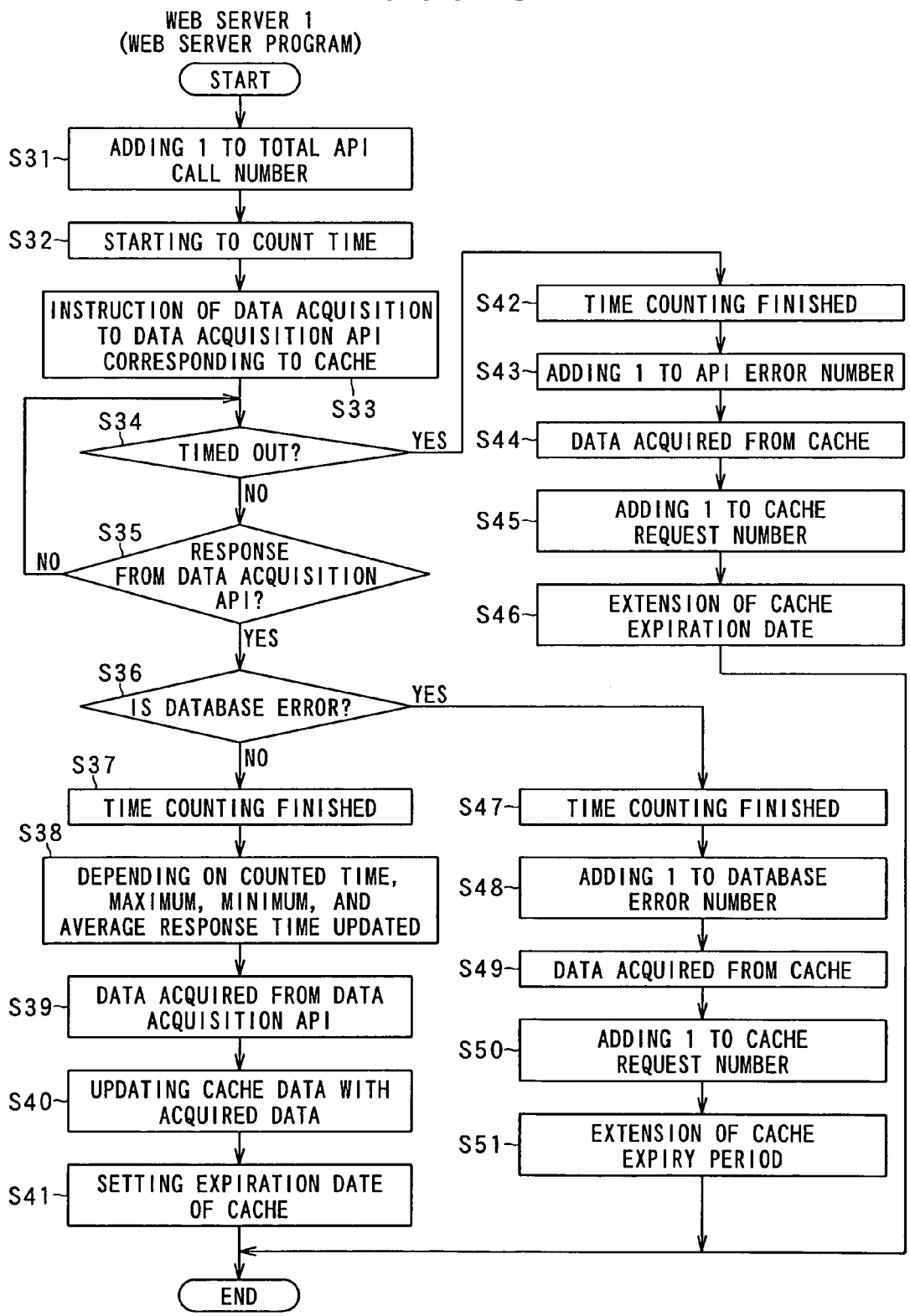
FIG. 8 is a flowchart showing an example of process of data acquisition/cache update process by a system control unit 20 of the web server 1 according to the present embodiment.

FIG. 8 is a flowchart showing an example of process of data acquisition/cache update process by the system control unit 20 of the web server 1 according to the present embodiment. Here, the process shown in FIG. 7 is carried out in a case where the web server program is executed.

First, the system control unit 20 adds 1 to a total API call number, which is memorized in the memory unit 15 in correspondence with the cache j thus specified, updates the total API call number (Step S31), sets up a timer, and starts to count time (Step S32).

Next, the system control unit 20 instructs acquisition of data to a data acquisition API-j corresponding to the cache j (Step S33).

Next, the system control unit 20 judges on the basis of the counted time whether or not the data acquisition API-j times out (Step S34). In a case where the data acquisition API-j times out (Step S34: YES), the process goes to Step S42.

On the other hand, in a case where the data acquisition API-j does not time out (Step S34: NO), the system control unit 20 judges whether or not any response from the data acquisition API-j is received (Step S35). In a case where a response from the data acquisition API-j is not received (Step S35: NO), the process goes to Step S34. That is, the system control unit 20 repeats processes in Steps S34 and S35 until the time-out is detected or a response from the data acquisition API-j is received.

Then, in a case where the response from the data acquisition API-j is received (Step S35: YES), the system control unit 20 judges whether or not the response is a database error (Step S36). In a case where the response is a database error (Step S36: YES), the process goes to Step S47.

On the other hand, in a case where the system control unit 20 judges that the response from the data acquisition API-j is not a database error, i.e. the response is a normal response (Step S36: NO), the system control unit 20 stops counting time (Step S37) and updates each of the maximum, minimum, and average response times, memorized in the memory unit 15 in correspondence with the cache j thus specified and in response to the counted time, i.e. the response time (Step S38).

Next, the system control unit 20 acquires data from the data acquisition API-j as data used for generating the top page 200 (Step S39), updates cache data memorized in the cache j to the data (Step S40), sets up an expiration date of the cache j again (Step S41), and finishes the data acquisition/update process.

Meanwhile, in a case where the data acquisition API-j times out in Step S34 (Step S34: YES), the system control unit 20 stops counting the time (Step S42) and adds 1 to the API error number memorized in the memory unit 15 which corresponds to the cache j thus specified (Step S43).

Next, the system control unit 20 acquires cache data as data for generation of the top page 200 from the cache j thus specified (Step S44), adds 1 to the cache request number memorized in the memory unit 15 which corresponds to the cache j, and updates the cache request number (Step S45).

Next, the system control unit 20 extends and sets up the expiration date of the cache j (Step S46) and finishes data acquisition/update process.

On the other hand, in a case where the response is a database error in Step S36 (Step S36: YES), the system control unit 20 stops counting the time (Step S47) and adds 1 to the database error number memorized in the memory unit 15 in correspondence with the cache data thus specified (Step S48).

Next, the system control unit 20 acquires cache data as data for generation of the top page 200 from the cache j thus specified (Step S49), adds 1 to the cache request number memorized in the memory unit 15 which corresponds to the cache j, and updates the cache request number (Step S50).

Next, the system control unit 20 extends and sets up the expiration date of the cache j (Step S51), and finishes data acquisition/update process.

Next, a process in the data acquisition API-j activated by the process in Step S33 in the data acquisition/cache update process shown in FIG. 8 will be described.

Figure 9:
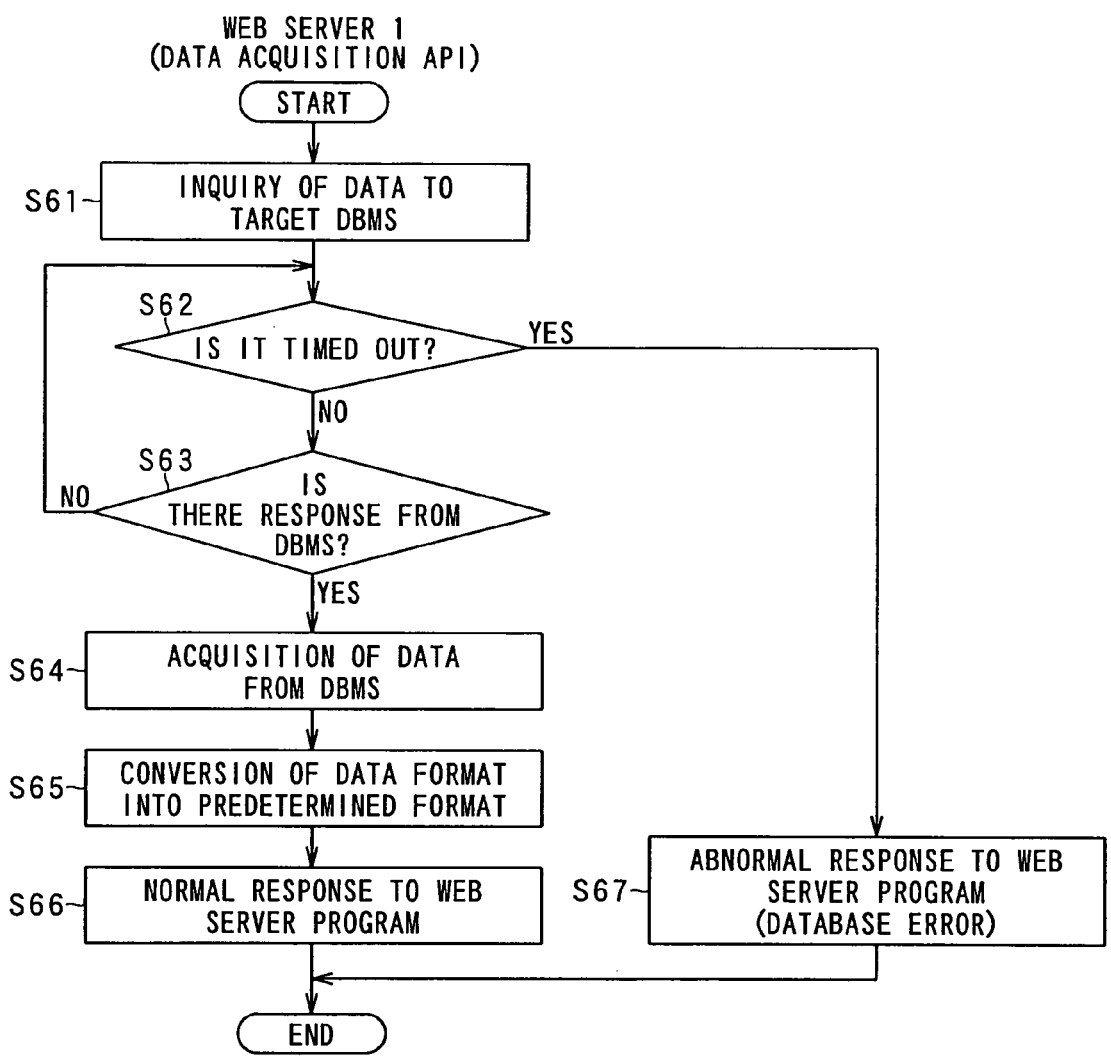
FIG. 9 is a flowchart showing an example of process by a data acquisition API-$j$ of the system control unit 20 of the web server 1 according to the present embodiment.

FIG. 9 is a flowchart showing an example of the data acquisition API-j in the system control unit 20 of the web server 1 according to the present embodiment.

First, the system control unit 20 generates an SQL command for a DBMS-j corresponding to the data acquisition API-j, and transmits the SQL command to the database server 3-j, to thereby inquiring data to the DBMS-j (Step S61).

Next, the system control unit 20 judges whether or not a predetermined period of time elapses after the inquiry is done and it times out (Step S62). In a case where it is judged that it times out (Step S62: YES), the system control unit 20 replies an abnormal response (database error) to the web server program (Step S67) and finishes the process.

On the other hand, in a case where it does not time out (Step S62: NO), the system control unit 20 judges whether or not a response from the DBMS-j (database server 3-j) is received (Step S63). In a case where no response is received (Step S63: NO), the process goes to Step S62. That is, the system control unit 20 repeats processes in Steps S62 and S63 until the time-out is detected or a response from the DBMS-j is received.

Then, in a case where a response from the DBMS-j is received (Step S63: YES), the system control unit 20 acquires data transmitted from the DBMS-j (Step S64) and converts the data format so that the data can easily be processed in the web server program.

Next, the system control unit 20 replies a normal response to the web server program (Step S66) and finishes the process.

FIG. 10 is a view showing an example of aggregation result of the API operation aggregation information in the process shown in FIGS. 7 and 8. In FIG. 10, data used for generation of the news headline area 203, data used for generation of the weather forecast display area 204, data used for generation of the news clipping display area 207, data used for generation of the TV program clipping display area 208, and data used for generation of the blog introduction area 209 are shown out of the top page 200.

The API operation aggregation information memorized in the memory unit 15 is, for example, displayed on the display unit 12, recorded onto a disc DK through the drive unit 14, or transmitted to another server or a terminal device for control through LAN under control by the system control unit 20.

As shown in FIG. 10, an identical value is set up in the total access number with respect to every data. Moreover, a sum of the total API call number and the cache request number becomes the total access number. Here, in a case where a cache request number is drastically larger than in the past and where there is a content having large error numbers, it is known that a page is generated without using new data read out due to a certain error. Further, it is possible to detect in advance that this content has a possibility of causing a trouble.

The error number is classified into the API error number and the database error number. If the API error number is totally larger than the database error number, it is highly possible that any trouble is occurring in the web server 1. Therefore, it is considered that the web server 1 needs to be strengthened. Alternatively, if the database error number is larger in any data in comparison with other data, it is highly possible that any trouble is occurring in a database server 3-j corresponding to the data. Therefore, it is known that the database server 3-j needs to be strengthened.

Moreover, it is possible to acquire a ratio of appropriate generation of the top page 200 per the total access number by the following equation:

(Total access number−Error number)/Total access number

Moreover, it is possible to acquire a ratio of acquisition of data per call by a data acquisition API-j by the following equation:

(Total API call number−Error number (or API error number, database error number))/Total API call number It is known that relatively lower these ratios are, more the web server 1 or the database server 3-j needs to be strengthened.

Although not shown, a cache is not provided for data having different content for each user. Therefore, the total access number, the total API call number, the error number (API error number and database error number), and each of response time are collected. However, the cache request number is not collected. In this case, the total access number becomes equal to the total API call number. In such the cases, since the API error number and the database error number can be collected, these information can be used as materials for judging whether or not to strengthen the web server 1 or the database server 3-j.

Here, these ratios (an example of appropriateness judgment information) may be calculated by the system control unit 20 and memorized in the memory unit 15 as a part of the API operation aggregation information.

Moreover, greater the values of the maximum, minimum, and average response time are, more load of the web server 1 or the database server 3-j tends to increase. In the example shown in FIG. 10, the time until the time-out of API with respect to each data is set up to be 3 seconds (3000 milliseconds). Therefore, the maximum response time does not basically exceed 3000 milliseconds.

As described above, according to the present embodiment, the system control unit 20 of the web server 1 judges whether or not an expiration date of cache data memorized in a cache j elapses upon reception of a top page request from the user terminal 4-k. At this time, the system control unit 20 generates the top page 200 using cache data memorized in a cache j if the expiration date does not elapse. On the other hand, if the expiration date elapses, the system control unit 20 acquires data registered in the database 2-j from the DBMS-j through the data acquisition API-j, updates the cache data memorized in the cache j by the cache data thus acquired, and generates the top page 200 using the cache data thus acquired. However, in a case where the system control unit 20 cannot acquire data through the data acquisition API-j due to detection of an API error or a database error, the top page 200 is generated by use of the cache data memorized in the cache j. Then, the system control unit 20 sends the top page 200 thus generated to the user terminal 4-k, and the system control unit 20 generates the API error number and the database error number, used for judging whether or not the top page 200 is appropriately generated, on the basis of the error detection result.

Therefore, even if the cache data are not acquired through the data acquisition API-j, the top page 200 is generated using the cache data having its expiration date elapsed and memorized in the cache j, the top page 200 is sent to the user terminal 4-k. Then it is possible to know whether or not the top page 200 is truly appropriately generated even in a case where it seems as if appropriate information is displayed on a screen of the user terminal 4-k.

Moreover, since an error number in DBMS-j and an error number in data acquisition API-j can be acquired as error numbers, it is possible to judge whether reinforcement of a system should be provided to the database server 3-j in which the database 2-j and the DBMS-j are incorporated or to the web server 1 in which the data acquisition API-j is incorporated.

In the above-mentioned embodiment, each data used for generation of the top page 200 is acquired sequentially one by one. However, the data may be acquired in parallel. Specifically, for example, the system control unit 20 of the web server 1 activates the data acquisition API-1 to m at once, and data acquirable through the data acquisition API-1 to m before the time-out are used for generation of the top page 200. Meanwhile, instead of data not acquirable before the time-out, cache data memorized in the cache j may be used for generation of the top page 200.

Further, in the above-mentioned embodiment, each data used for generation of the top page 200 are registered by dividing into databases 2-l to 2-m, and controlled by each database 3-l to 3-m. However, the data maybe managed by only one database and one database server, by for example the database 2-j and the database server 3-j. Further, the web server 1 and the database server 3-j may be configured by one server device.

Further, in the above-mentioned embodiment, a cache j is provided on a storage area of the memory unit 15. However, for example, the cache j may be provided on a storage area of the RAM 19.

Further, in the above-mentioned embodiment, top page of a portal site is applied as screen information. However, a web page other than the top page, a web page of a web site other than a portal site, or other screen information which configures display screen may be applied.

The present invention is not confined to the configurations listed in the foregoing embodiments, but it is easily understood that the person skilled in the art can modify such configurations into various other modes, within the scope of the present invention described in the claims.

The entire disclosures of Japanese Patent Applications No. 2007-035715 filed on Feb. 16, 2007 including the specification, claims, drawings and summary are incorporated herein by reference in its entirety.

What is claimed is:

1. An information providing device comprising:
   a registration information memory means for memorizing registration information which is registered in a database and is acquired from a database management system through a program interface for outputting inquiry information indicative of an inquiry to the database management system for managing the database;
   a request information receiving means for receiving request information indicative of a request for screen information configuring display screen of presentation information, presented to a user, the request information being transmitted from a terminal device through a network on the basis of an instruction from a user;
   an expiration date lapse judgment means for judging whether or not an expiration date set up with respect to the registration information, stored in the registration information memory means, elapses in a case where the request information is received;
   a registration information acquisition / update means for acquiring the registration information through the program interface and for updating the registration information stored in the registration information memory means to the registration information thus acquired, in a case where the expiration date elapses;
   an acquisition error detection means for detecting an acquisition error of the registration information through the program interface;
   a screen information generation means for generating the screen information using the registration information stored in the registration information memory means in any one of cases where the expiration date does not lapse or where the acquisition error is detected, and for generating the screen information using the registration information memorized in the registration information memory means if the registration information is acquired through the program interface;
   a screen information transmission means for transmitting the screen information thus generated through the network to the terminal device transmitting the request information; and
   an appropriateness judgment information generation means for generating appropriateness judgment information used for judging whether or not the screen information is appropriately generated on the basis of detection result of the acquisition error.

2. The information providing device according to claim 1, wherein the appropriateness judgment information generation means generates the appropriateness judgment information including acquisition error number information indicative of a detected number of the acquisition errors.

3. The information providing device according to claim 2, wherein the acquisition error detection means detects an error in the database management system and an error in the program interface excluding an error in the database management system, respectively as the acquisition error, and
   the appropriateness judgment information generation means generates the appropriateness judgment information including first error number information indicative of an error number in the database system and second error number information indicative of an error number in the program interface.

4. An appropriateness judgment information generation method in an information providing device including a registration information memory means for storing registration information which is registered in a database and is acquired from a database management system through a program interface for outputting inquiry information indicative of an inquiry to the database management system for managing the database, comprising:
   a request information receiving step of receiving request information indicative of screen information request configuring display screen of presentation information suggested to a user, the request information being transmitted from a terminal device through a network on the basis of an instruction from a user;
   an expiration date lapse judgment step of judging whether or not an expiration date set up for the registration information, memorized in the registration information memory means elapses, in a case where the request information is received;
   a registration information acquisition/update step of acquiring the registration information through the program interface and of updating the registration information memorized in the registration information memory means to the registration information thus acquired, in a case where the expiration date elapses;

an acquisition error detection step of detecting an acquisition error of the registration information through the program interface;

a screen information generation step of generating the screen information using the registration information memorized in the registration information memory means in any one of cases where the expiration date does not elapse or where the acquisition error is detected, and for generating the screen information using the registration information thus acquired in the case where the registration information is acquired through the program interface;

a screen information transmission step of transmitting the screen information thus generated through the network to the terminal device transmitting the request information; and an appropriateness judgment information generation step of generating appropriateness judgment information used for judging whether or not the screen information is appropriately generated on the basis of the error detection result.

5. An appropriateness judgment information generation process program embodied in a non-transient computer readable medium, the program causing a computer included in an information providing device having a registration information memory means for memorizing registration information, which is registered in a database and is acquired from a database management system through a program interface for outputting inquiry information indicative of an inquiry to the database management system for managing the database, to function as:

a request information receiving means for receiving request information indicative of request for screen information configuring a display screen of presentation information presented to a user, the request information being transmitted from a terminal device through a network on the basis of an instruction from a user;

an expiration date lapse judgment means for judging whether or not an expiration date set up for the registration information memorized in the registration information memory means elapses, in a case where the request information is received;

a registration information acquisition / update means for acquiring the registration information through the program interface and for updating the registration information memorized in the registration information memory means to the registration information thus acquired, in a case where the expiration date elapses;

an acquisition error detection means for detecting an acquisition error of the registration information through the program interface;

a screen information generation means for generating the screen information using the registration information memorized in the registration information memory means in any one of cases where the expiration date does not elapse or where the acquisition error is detected, and for generating the screen information using the registration information thus acquired in a case where the registration information is acquired through the program interface;

a screen information transmission means for transmitting the screen information thus generated through the network to the terminal device transmitting the request information; and an appropriateness judgment information generation means for generating appropriateness judgment information used for judging whether or not the screen information is appropriately generated on the basis of the acquisition error detection result.

* * * * *